(12) United States Patent
Shin et al.

(10) Patent No.: US 10,507,704 B2
(45) Date of Patent: Dec. 17, 2019

(54) AIR-CONDITIONING SYSTEM FOR VEHICLE

(71) Applicants: Hyundai Motor Company, Seoul (KR); Kia Motors Corporation, Seoul (KR)

(72) Inventors: Gee Young Shin, Gyeonggi-do (KR); Dae Ig Jung, Gyeonggi-do (KR); Seung Hyeok Chang, Gyeonggi-do (KR); Dong Ho Kwon, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 16/008,612

(22) Filed: Jun. 14, 2018

(65) Prior Publication Data
US 2019/0176565 A1 Jun. 13, 2019

(30) Foreign Application Priority Data
Dec. 8, 2017 (KR) .......................... 10-2017-0168661

(51) Int. Cl.
*B60H 1/00* (2006.01)
*B60H 1/32* (2006.01)
*B60H 1/12* (2006.01)

(52) U.S. Cl.
CPC ..... *B60H 1/00028* (2013.01); *B60H 1/00835* (2013.01); *B60H 1/00878* (2013.01); *B60H 1/12* (2013.01); *B60H 1/3229* (2013.01); *B60H 2001/00085* (2013.01); *B60H 2001/00092* (2013.01)

(58) Field of Classification Search
CPC ............ B60H 1/00057; B60H 1/00885; B60H 1/00028; B60H 1/00835; B60H 1/00878; B60H 1/12; B60H 1/3229; B60H 2001/00085; B60H 2001/00092
USPC ........................................................ 165/202
See application file for complete search history.

(56) References Cited

U.S. PATENT DOCUMENTS

| | | | | |
|---|---|---|---|---|
| 5,127,576 A | * | 7/1992 | Weatherhead | B60H 1/00885 165/202 |
| 2017/0100986 A1 | * | 4/2017 | Shin | B60H 1/00057 |
| 2017/0167776 A1 | * | 6/2017 | Shin | B60H 1/00057 |

FOREIGN PATENT DOCUMENTS

KR 10-2009-0015199 2/2009

* cited by examiner

*Primary Examiner* — Davis D Hwu
(74) *Attorney, Agent, or Firm* — Mintz Levin Cohn Ferris Glovsky and Popeo, P.C.; Peter F. Corless

(57) ABSTRACT

An air-conditioning system for a vehicle is provided. The system includes a heating blower and a cooling blower that are disposed on opposite sides with an adjustment space being interposed there between. A first duct and a second duct transfer outside air or inside air and extend in the axial direction of the heating blower and the cooling blower. An inlet door unit is disposed in the adjustment space and adjusts the air introduced from the first duct or the second duct to be selectively supplied to the heating blower or the cooling blower. A condenser and an evaporation core are respectively disposed in the radial directions of the heating blower and the cooling blower and are connected via a refrigerant line. An outlet door unit regulates the air to be selectively discharged to the indoor space or the outdoor space.

24 Claims, 6 Drawing Sheets

AIR-CONDITIONING SYSTEM FOR VEHICLE

CROSS REFERENCE TO RELATED APPLICATION

The present application claims priority to Korean Patent Application No. 10-2017-0168661, filed Dec. 8, 2017, the entire contents of which is incorporated herein for all purposes by this reference.

BACKGROUND

1. Field of the Disclosure

The present disclosure relates to an air-conditioning system for a vehicle, and more particularly, to a vehicular air-conditioning system that increases a rapid acting property while having a compact layout.

2. Description of the Prior Art

Generally, vehicles are provided with an air-conditioning system for indoor cooling and heating. The air-conditioning system maintains the indoor temperature of the vehicle at a desired temperature. In particular, a cooling system includes a compressor configured to compress a refrigerant, a condenser configured to condense the refrigerant compressed in the compressor, an expansion valve configured to convert the refrigerant condensed and liquefied in the condenser into a low temperature and low pressure state, an evaporator configured to cool air using the evaporation latent heat of the refrigerant, and the like. Generally, such a cooling system decreases the temperature of the air and regulates absolute humidity.

A heating system uses coolant to cool the heat of the engine compartment as a heat source when the coolant receives the heat of the engine and becomes a high heat temperature state, and includes a heater core and a pump configured to circulate the coolant of the engine. Generally, such a heating system increases the temperature of the air and regulates the relative humidity. In the conventional air-conditioning system, the cool air is supplied from the cooler and the warm air is supplied through the coolant of the engine. However, when there is no coolant of the engine as in an electric vehicle or a hybrid vehicle or when the temperature of the coolant is insufficiently low, it is difficult and ineffective to configure an air-conditioning device in the conventional manner. In addition, in an environment-friendly vehicle such as an electric vehicle, the driving of the motor and also the driving of all the devices of the vehicle consumes battery energy, and this is directly related to the decrease of the travel distance. Accordingly, minimizing wasted energy is an important factor.

It should be understood that the foregoing description of the background art is merely for the purpose of promoting an understanding of the background of the present disclosure and is not to be construed as an admission that the prior art is known to those skilled in the art.

SUMMARY

The present disclosure provides a vehicular air-conditioning system that has a rapid acting property in cooling or heating while being configured to have a compact structure.

In accordance with an aspect of the present disclosure, the present disclosure provides an air-conditioning system for a vehicle that may include: a heating blower and a cooling blower disposed on opposite sides to face each other with an adjustment space being interposed therebetween, the heating blower and the cooling blower being configured to introduce air thereinto in an axial direction from the adjustment space and to discharge the air in a radial direction; a first duct and a second duct configured to transfer outside air or inside air and extending in the axial direction of the heating blower and the cooling blower with a first end of each of the first duct and the second duct connected to the adjustment space to supply the outside air or the inside air to the adjustment space; an inlet door unit disposed in the adjustment space and configured to adjust the air introduced from the first duct or the second duct to be selectively supplied to the heating blower or the cooling blower; a condenser and an evaporation core respectively disposed in the radial directions of the heating blower and the cooling blower and connected to each other via a refrigerant line; and an outlet door unit configured to regulate the air, passed through the condenser or the evaporation core, to be selectively discharged to the indoor space or the outdoor space. A direction of the air flowing through the first duct and the second duct may intersect with a direction of the air ejected from the heating blower or the cooling blower.

The first duct and the second duct may be arranged vertically, the air introduced into the adjustment space from the first duct may be introduced into the adjustment space through an upper side of one of the cooling blower and the heating blower disposed on an inlet port side of the adjustment space, and the air introduced into the adjustment space from the second duct may be introduced into the adjustment space through a lower side of one of the cooling blower and the heating blower disposed on the inlet port side of the adjustment space.

The first duct may include an outside air inlet port formed in a second end thereof and may be disposed above an engine compartment and the outside air inlet port may be disposed above the cowl panel, and thus, outside air introduced through the outside air inlet port disposed on the cowl panel side may move in one or both of the first duct and the second duct and may be then introduced into the adjustment space. The second duct may include an inside air inlet port formed in a second end thereof and may be connected to a dash board of an engine compartment, to move the inside air in one or both of the first duct and the second duct through the dash board and the air may then be into the adjustment space.

The first duct and the second duct may be disposed in an engine compartment, one of the first duct and the second duct may include an outside air inlet port through which the outside air is introduced, and the outside air inlet port may communicate with the outside of the vehicle on the cowl panel side. The second one of the first duct and the second duct (e.g., the remaining of the two) may include an inside air inlet port through which inside air is introduced, the inside air inlet port may be disposed in the dash panel, and thus, air introduced from the cowl panel or dash panel side may move in one or both of the first duct and the second duct and may then be introduced into the adjustment space. The first duct and the second duct may be disposed in the engine compartment, the inside air inlet port and the outside air inlet port may be disposed on the indoor side with respect to the dash panel, and the outdoor space may be an interior of the engine compartment.

An adjustment door unit may be disposed between the outside air inlet port and the inside air inlet port to open or close the outside air intake side or the inside air inlet port side to adjust a flow rate of the air introduced through the outside air inlet port and the outside air inlet port. The second duct may include an outside air inlet aperture formed on the outside air inlet port side and an inside air inlet aperture formed on the inside air inlet port side, and a control door unit may be disposed between the outside air inlet aperture and the inside air inlet aperture.

The outside air inlet aperture of the second duct may be formed in a wall surface at a point where the first duct and the second duct branch, and thus, even when the outside air inlet aperture is closed by the adjustment door unit, the outside air may be introduced into one or both of the first duct and the second duct. When the adjustment door unit closes the outside air inlet aperture, the inside air introduced through the inside air inlet aperture may move to (e.g., be guided towards) one of the first duct and the second duct, and the outside air introduced through the outside air inlet aperture may move to a remaining one of the first duct and the second duct, to isolate the flow paths in which the inside air and the outside air move from each other. The outside air introduced through the outside air inlet aperture when the adjustment door unit closes the inside air inlet aperture may branch and move into the first duct and the second duct.

The air-conditioning system may further include: a heating duct disposed in the radial direction of the heating blower and forming a flow path, which allows the air introduced into the adjustment space to be selectively discharged to the indoor space or the outdoor space through the heating blower and the condenser; and a cooling duct disposed in the radial direction of the cooling blower and forming a flow path, which allows the air introduced into the adjustment space to be selectively discharged to the indoor space or the outdoor space through the cooling blower and the evaporation core.

The cooling duct and the heating duct may be arranged vertically and the air introduced into the adjustment space may be heated through the condenser or cooled through the evaporation core and may then be selectively discharged to the indoor space or the outdoor space by the outlet door unit. The cooling duct and the heating duct may be configured with a single duct, which is separated into the cooling duct and the heating duct by a partition wall formed therein and thus, a cold air flow path and a hot air flow path may be separated. Each of the cooling duct and the heating duct may include an outdoor outlet port through which the air introduced through the adjustment space may be discharged to the outdoor space and only one indoor outlet port, through which the air is discharged to the indoor space, may be formed on an indoor side and thus, the indoor outlet port may be shared by the cooling duct and the heating duct.

Further, the outlet door unit may include a heating inside/outside air adjustment door configured to selectively discharge the air, which has passed through the condenser, to the indoor space or the outdoor space, and a cooling inside/outside air adjustment door configured to selectively discharge the air, which has passed through the evaporation core, to the indoor space or the outdoor space. The air introduced into the upper side of the adjustment space may be introduced into a rotary shaft of the heating blower or the cooling blower by the inlet door unit and may then be discharged to the condenser disposed in the radial direction of the heating blower or the evaporation core disposed in the radial direction of the cooling blower.

The air introduced into the lower side of the adjustment space may be introduced into a rotary shaft of the heating blower or the cooling blower by the inlet door unit and may then be discharged to the condenser disposed in the radial direction of the heating blower or the evaporation core disposed in the radial direction of the cooling blower. The inlet door unit may include a first door having an opening degree of that may be adjusted to transfer the air, which is introduced into an upper side of the adjustment space, to a rotary shaft of the heating blower or the cooling blower, and a second door having an opening degree that may be adjusted to transfer the air, which is introduced into a lower side of the adjustment space, to the rotary shaft of the heating blower or the cooling blower.

The air-conditioning system may further include a controller configured to control introduction of air by adjusting rotation of the heating blower and the cooling blower; adjust an opening degree of an inlet door unit such that the air introduced into the adjustment space may be transferred to the condenser or the evaporation core side; and adjust an opening degree of an outlet door unit to transfer the air to the indoor space or the outdoor space.

The air-conditioning system may further include an adjustment door unit configured to adjust inside air or outside air within each of the first duct and the second duct. In a maximum cooling mode, the controller may be configured to operate the adjustment door unit to allow both the inside air and the outside air to be introduced, and may be configured to operate the inlet door unit and the outlet door unit to transfer the inside air to the evaporation core to be cooled and then to be discharged to the indoor space and the outside air may be transferred to the condenser to be heated and then to be discharged to the outdoor space.

The air-conditioning system may further include an adjustment door unit configured to adjust introduction of inside air or outside air within each of the first duct and the second duct. In a heating mode using outside air, the controller may be configured to operate the adjustment door unit to allow both the inside air and the outside air to be introduced, operate the inlet door unit and the outlet door unit such that the inside air may be transferred to the evaporation core to be cooled and then to be discharged to the outdoor space and the outside air may be transferred to the condenser to be heated and then to be discharged to the indoor space.

The air-conditioning system may further include an adjustment door unit configured to adjust introduction of inside air or outside air within the first duct or the second duct, and a blocking door installed between the evaporation core and the condenser. In a dehumidifying mode, the controller may be configured to operate the adjustment door unit to block the inside air and to allow the outside air to be introduced, may be configured to operate the inlet door unit and the outlet door unit to transfer the outside air to the evaporation core to be cooled and to be dehumidified, and may then be configured to operate a mix door to transfer dehumidified air to the condenser to be heated and then to be discharged to the indoor space.

The air-conditioning system may further include an adjustment door unit configured to adjust introduction of inside air or outside air within each of the first duct and the second duct. In a maximum heating mode partially using inside air, the controller may be configured to operate the adjustment door unit to allow both the inside air and the outside air to be introduced, and may be configured to operate the inlet door unit and the outlet door unit to transfer both the inside air and outside air to the evaporation core and the condenser to be cooled and heated, the air cooled through the evaporation core being discharged to the outdoor space and the air heated through the condenser being discharged to the indoor space.

The heating blower or the cooling blower may be opened on the adjustment space side with respect to the adjustment space and a rear side of the adjustment space may be closed to introduce the outside air or the inside air into the adjustment space and then to introduce the air toward a rotary shaft of the heating blower or the cooling blower from the adjustment space.

According to the air-conditioning system configured as described above, the layout of the vehicle may be maintained by utilizing the cowl panel side as the outdoor inlet flow path, and the air-conditioning system is provided at a place, which is closest to the indoor space, thereby minimizing heat loss. In addition, the air-conditioning system may be formed in a more compact shape by forming the inlet port and the outlet port, through which the inside air or the outside air is introduced, at right angles. By causing the outside air to bypass to the indoor space, the temperature of the outside air may be increased or decreased to thus improve the entire system performance.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a vehicular air-conditioning system according to an exemplary embodiment of the present disclosure will be described with reference to the accompanying drawings.

Figure 1:
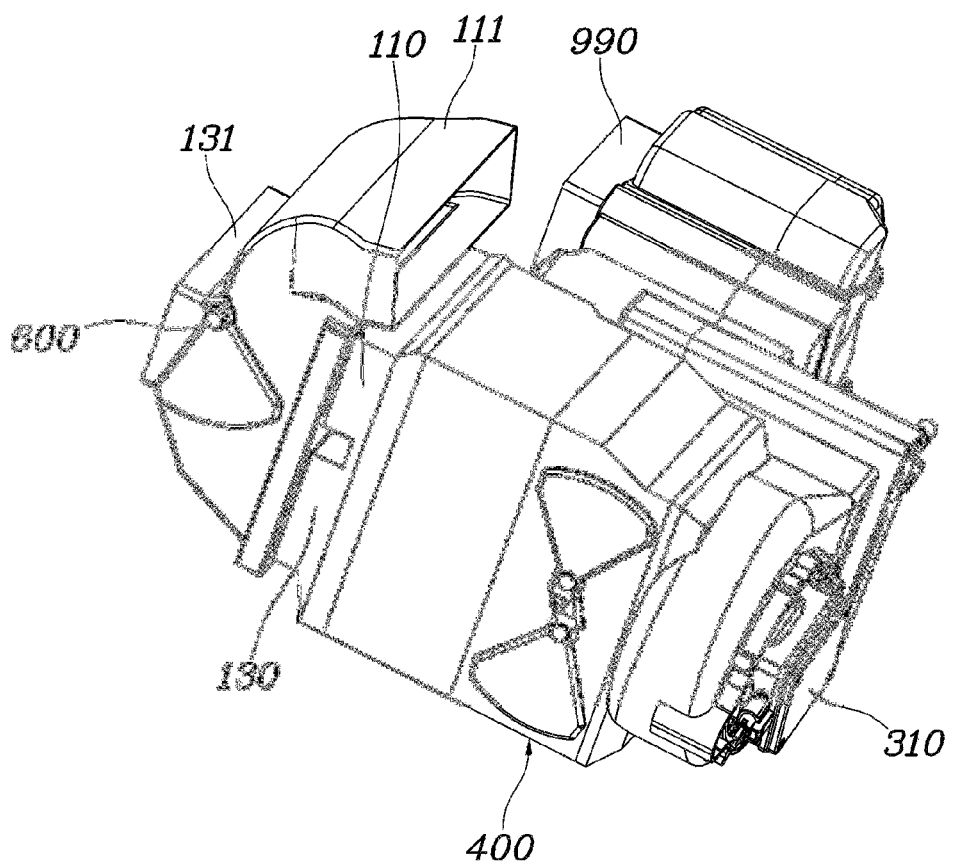
FIG. 1 is a view illustrating a vehicular air-conditioning system according to an exemplary embodiment of the present disclosure.
Figure 2A:
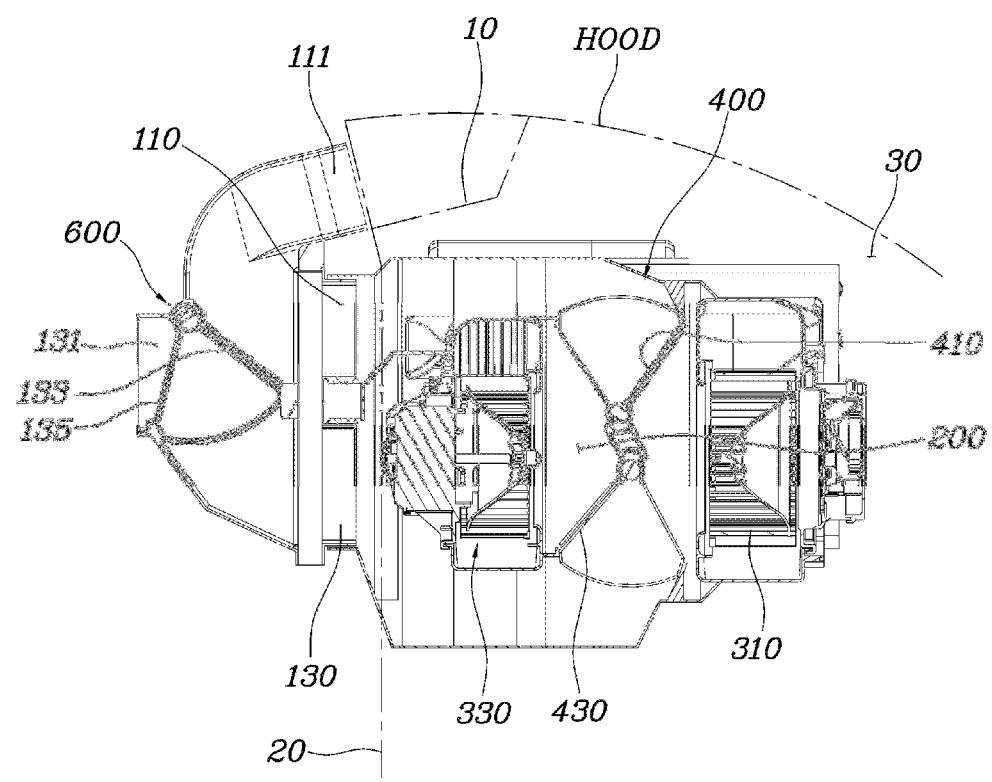
FIGS. 2A and 2B are cross-sectional views of FIG. 1 according to an exemplary embodiment of the present disclosure.
Figure 2B:
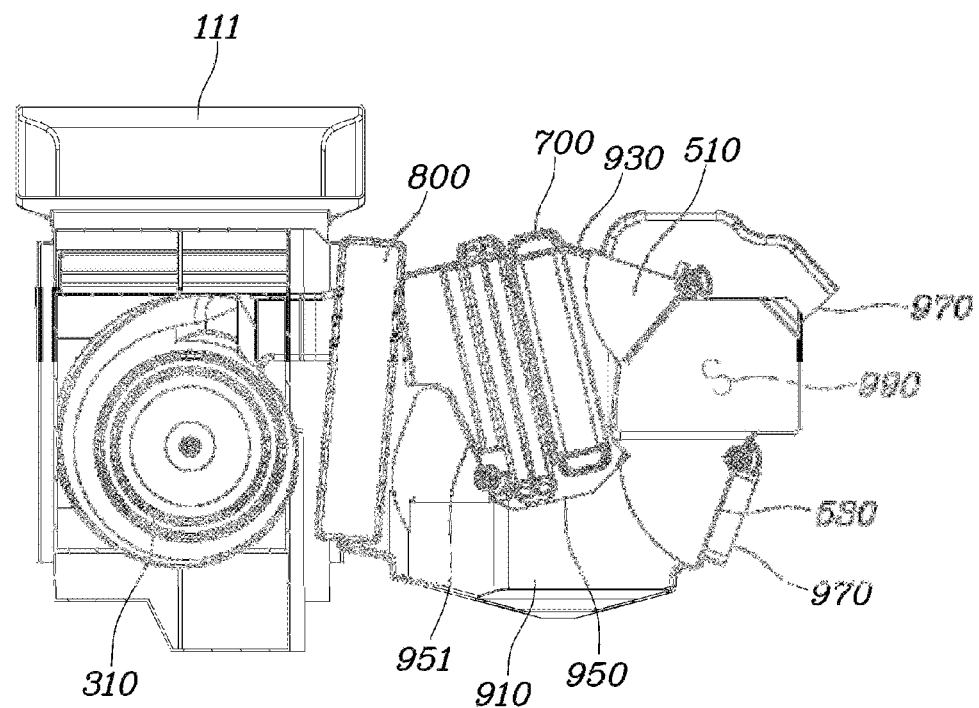

FIG. 1 is a view illustrating a vehicular air-conditioning system according to an exemplary embodiment of the present disclosure, FIGS. 2A and 2B are cross-sectional views of FIG. 1, and FIGS. 3 to 6 are views each illustrating the flow of air for each mode.

As illustrated in FIGS. 1 and 2A-2B, a vehicular air-conditioning system according to an exemplary embodiment of the present disclosure may include: a heating blower 330 and a cooling blower 310 disposed on opposite sides to face each other and having an adjustment space 200 interposed therebetween, the heating blower 330 and the cooling blower 310 configured to receive air introduced thereinto from the adjustment space 200 in an axial direction and to discharge the air from the heating blower 330 and the cooling blower 310 in a radial direction; a first duct 110 and a second duct 130 configured to transfer outside air or inside air and extending in the axial direction of the heating blower 330 and the cooling blower 310 with a first end of each of the first duct 110 and the second duct 130 connected to the adjustment space 200 to supply the outside air or the inside air to the adjustment space 200; an inlet door unit 400 disposed in the adjustment space 200 and configured to adjust the air introduced from the first duct 110 or the second duct 130 to be selectively supplied to the heating blower 330 or the cooling blower 310; a condenser 700 and an evaporation core 800 respectively disposed in the radial directions of the heating blower 330 and the cooling blower 310 and connected to each other via a refrigerant line; and an outlet door unit 500 configured to regulate the air, which has passed through the condenser 700 or the evaporation core 800, to be selectively ejected to the indoor space or the outdoor space. The direction of the air flowing through the first duct 110 and the second duct 130 intersects with the direction of the air ejected from the heating blower 330 or the cooling blower 310.

The air-conditioning system of the present disclosure may be disposed in the engine compartment 30 of the vehicle, in particular above a drive motor. In the present disclosure, descriptions will be made assuming that the first duct 110 and the second duct 130 are vertically arranged, the outside air is introduced into the first duct 110 and the inside air is introduced into the second duct 130, as an example. However, various changes may be freely made in terms of the arrangement and the air flowing in the first duct 110 and the second duct 130.

The first duct 110 and the second duct 130 may be configured to transfer the outside air or the inside air, and a first side of the first duct 110 and the second duct 130 extends along the axial direction of the heating blower 330 and the cooling blower 310. An outside air inlet port 111 through which outside air is introduced may be formed on a second side of the first duct 110 and the second duct 130. More specifically, the first duct 110 may include, on the second end thereof, the outside air inlet port 111 through which the outside air may be introduced. The first duct 110 may be disposed above the engine compartment 30, and the outside air inlet port 111 may be disposed above the cowl panel 10 to transfer the outside air introduced through the outside air inlet port 111 located on the cowl panel 10 into one or both of the first duct 110 and the second duct 130 and then introduce the air into the adjustment space 200. In addition, the second duct 130 may include, on the second end thereof, an inside air inlet port 131 through which the inside air is introduced. The second duct 130 may be connected to the dashboard 20 of the engine compartment 30 to transfer the inside air in one or both of the first duct 110 and the second duct 130 through the dashboard 20 and then the air may be introduced into the adjustment space 200.

In other words, in the present disclosure, the first duct 110 and the second duct 130 may be disposed in the engine compartment 30, one of the first duct 110 and the second duct 130 may include an outside air inlet port 111 into which the outside air is introduced, and the outside air inlet port 111 may communicate with the outside of the vehicle on the cowl panel 10 side. The remaining one of the first duct 110 and the second duct 130 may include an inside air inlet port 131 through which the inside air is introduced, the inside air inlet port 131 may be disposed in the dash panel to transfer the air introduced from the cowl panel 10 or the dash panel side in one or both of the first duct 110 and the second duct 130 and then the air may be into the adjustment space 200.

The air introduced into the adjustment space 200 from the first duct 110 may pass through the upper side of one of the cooling blower 310 and the heating blower 330 disposed at the inlet side of the adjustment space 200 and then may be introduced into the adjustment space 200, and the air introduced into the adjustment space 200 from the second duct 130 may pass through the lower side of one of the cooling blower 310 and the heating blower 330 disposed at the inlet side of the adjustment space 200, and then may be introduced into the adjustment space 200. Particularly, the rear half of the air-conditioning system, which includes the first duct 110 and the second duct 130, may be disposed in the engine compartment 30, and the inside air inlet port 131 and the outside air inlet port 111, formed on the second side of the first duct 110 and the second duct 130, may be disposed on the indoor side with respect to the dash panel. Therefore, the outdoor space, to which the cooled or heated air is discharged, is the inside of the engine compartment 30.

An adjustment door unit 600 may be disposed between the outside air inlet port 111 and the inside air inlet port 131, to open or close the outside air inlet port 111 side or the inside air inlet port 131 side to thus adjust the flow rate of the air flowing through the outside air inlet port 111 and the inside air inlet port 131. Particularly, the second duct 130 may include an outside air inlet aperture 133 formed on the outside air inlet port 111 side and an inside air inlet aperture 135 formed on the inside air inlet port 131, and the adjustment door unit 600 may be disposed between the outside air inlet aperture 133 and the inside air inlet aperture 135. The outside air inlet aperture 133 of the second duct 130 may be formed in the wall surface at a point where the first duct 110 and the second duct 130 branch, and thus, the outside air inlet aperture 133 may be closed by the adjustment door unit 600, the outside air may be continuously introduced into at least one of the first duct 110 and the second duct 130. When the adjustment door unit 600 closes the outside air inlet aperture 133, the inside air introduced through the inside air inlet aperture 135 may move to one of the first duct 110 and the second duct 130, and the outside air introduced through the outside air inlet aperture 133 may move to the remaining one of the first duct 110 and the second duct 130, and thus, the flow paths in which the inside air and the outside air move may be isolated from each other. In addition, the outside air, which is introduced through the outside air inlet aperture 133 when the adjustment door unit 600 closes the inside air inlet aperture 135, branches and moves into the first duct 110 and the second duct 130. Therefore, even when the inside air inlet aperture 135 or the outside air inlet aperture 133 is closed by the adjustment door unit 600, the outside air may be continuously introduced into the inside of the air-conditioning system, thereby reducing the amount of carbon dioxide in the indoor space and reducing humidity, so that the optimal degree of pleasant air may be supplied to the user.

The air introduced through the outside air inlet port 111 or the inside air inlet port 131 may be introduced into the adjustment space 200 through the first duct 110 or the second duct 130. The adjustment space 200 may include, on the opposite sides thereof, the heating blower 330 and the cooling blower 310 which are disposed to face each other with the adjustment space 200 being interposed therebetween. In the present disclosure, a description is made of a configuration in which the heating blower 330 is disposed adjacent to the first duct 110 and the second duct 130, the adjustment space 200 is formed at a predetermined distance from the heating blower 330, and then the cooling blower 310 is disposed, by way an example, but the present disclosure is not limited thereto.

In addition, the heating blower 330 and the cooling blower 310 of the present disclosure are configured such that the adjustment space 200 is opened at the adjustment space 200 side and the rear side of the adjustment space 200 is closed with reference to the adjustment space 200. Therefore, when the outside air or the inside air is introduced into the adjustment space 200 through the first duct 110 and the second duct 130, the air may be introduced only into the inlet port on the adjustment space 200 side of the heating blower 330 or the cooling blower 310 and then may be radially ejected, rather than being introduced into the heating blower 330 or the cooling blower to the rear side of the heating blower 330 or the cooling blower 310.

In the radial direction of the heating blower 330, a heating duct 910 may be provided to form a flow path to allow the air introduced into the adjustment space 200 to be selectively discharged to the indoor space or the outdoor space through the heating blower 330 and the condenser 700. In addition, in the radial direction of the cooling blower 310, a cooling duct 930 may be provided to form a flow path to allow the air introduced into the adjustment space 200 to be selectively discharged to the indoor space or the outdoor space through the cooling blower 310 and the evaporation core 800. The heating duct 910 and the cooling duct 930 may be formed in a direction crossing the first duct 110 and the second duct 130. Therefore, the entire air-conditioning system may be configured in a more compact formed compared to the conventional system.

The cooling duct 930 and the heating duct 910 may be arranged vertically as the first duct 110 and the second duct 130 and the air introduced into the adjustment space 200 may be heated through the condenser 700 or cooled through the evaporation core 800 and then may be selectively discharged to the indoor space or the outdoor space by the outlet door unit 500. The cooling duct 930 and the heating duct 910 are may be in a single duct and may be separated from each other by a partition wall 950 formed therein to separate a cold air flow path and a hot air flow path from each other. In the partition wall 950, a blocking door 951 may be formed at a point between the condenser 700 and the evaporation core 800. In addition, an outdoor outlet port 970 and an indoor outlet port 990 may be formed in the cooling duct 930 and the heating duct 910 to discharge the air introduced through the adjustment space 200. In particular, the outdoor outlet port 970 may be formed in each of the cooling duct 930 and the heating duct 910, and only one indoor outlet port 990 to be discharged to the indoor space may be formed on the indoor side to be shared by the cooling duct 930 and the heating duct 910.

The outlet door unit 500 may be configured to adjust the air, which has passed through the condenser 700 or the evaporation core 800, to be selectively discharged into the indoor space or the outdoor space. The outlet door unit 500 may be disposed between the indoor outlet port 990 and the outdoor outlet ports 970 of the heating duct 910 and the cooling duct 930. Particularly, the outlet door unit 500 may include a heating inside/outside air adjustment door 510 to adjust the air, which has passed through the condenser 700, to be selectively discharged into the indoor space or the outdoor space, and a cooling inside/outside air adjustment door 530 to adjust the air, which has passed through the evaporation core 800, to be selectively discharged into the indoor space or the outdoor space. Therefore, the hot air and cold air, which are heated or cooled by the condenser 700 or the evaporation core 800, and mixed air may be discharged into the indoor space or the outdoor space by the heating inside/outside air adjustment door 510 and the cooling inside/outside air adjustment door 530.

In the vehicular air-conditioning system of the present disclosure, the air introduced into the upper side of the adjustment space 200 may be introduced into the rotary shaft of the heating blower 330 or the cooling blower 310 by the inlet door unit 400, and then may be discharged to the condenser 700 disposed in the radial direction of the heating blower 330 or the evaporation core 800 disposed in the radial direction of the cooling blower 310. In addition, the air introduced into the lower side of the adjustment space 200 may be introduced into the rotary shaft of the heating blower 330 or the cooling blower 310 by the inlet door unit 400 and then may be discharged into the condenser 700 disposed in the radial direction of the heating blower 330 or the evaporation core 800 disposed in the radial direction of the cooling blower 310. Thus, the inside air and the outside air may be heated or cooled in the cooling duct 930 or the heating duct 910 and then may be discharged into the indoor space or the outdoor space without being mixed in the first duct 110 and the second duct 130, to adjust the humidity or carbon dioxide.

Further, the adjustment space 200 may include the inlet door unit 400 configured to adjust the air, which is introduced from the first duct 110 or the second duct 130, to be selectively supplied to the heating blower 330 or the cooling blower 310. In particular, the inlet door unit 400 may include a first door 410 and the opening degree of is the first door 410 may be adjusted to transfer the air introduced into the upper side of the adjustment space 200 to the rotary shaft of the heating blower 330 or the cooling blower 310, and a second door 430 and the opening degree of the second door 430 may be adjusted to transfer the air introduced into the lower side of the adjustment space 200 to the rotary shaft of the heating blower 330 or the cooling blower 310. Accordingly, the air, introduced into the adjustment space 200 in response to the opening/closing of the first door 410 or the opening/closing of the second door 430, may be introduced into the cooling duct 930 or the heating duct 910.

In addition, the present disclosure may further include a controller (not illustrated) configured to: adjust the introduction of air by adjusting the rotation of the heating blower 330 and the cooling blower 310; adjust the opening degree of the inlet door unit 400 to cause the air introduced into the adjustment space 200 to be transferred to the condenser 700 or evaporation core 800 side; and adjust the opening degree of the outlet door unit 500 to cause the air to be transferred to the indoor space or the outdoor space. Accordingly, various doors and blowers may be operated and adjusted, so that air-conditioning desired by the user may be performed. FIGS. 3 to 6 are views each illustrating the flow of air for each mode, which will be described in more detail with reference to the drawings.

Figure 3:
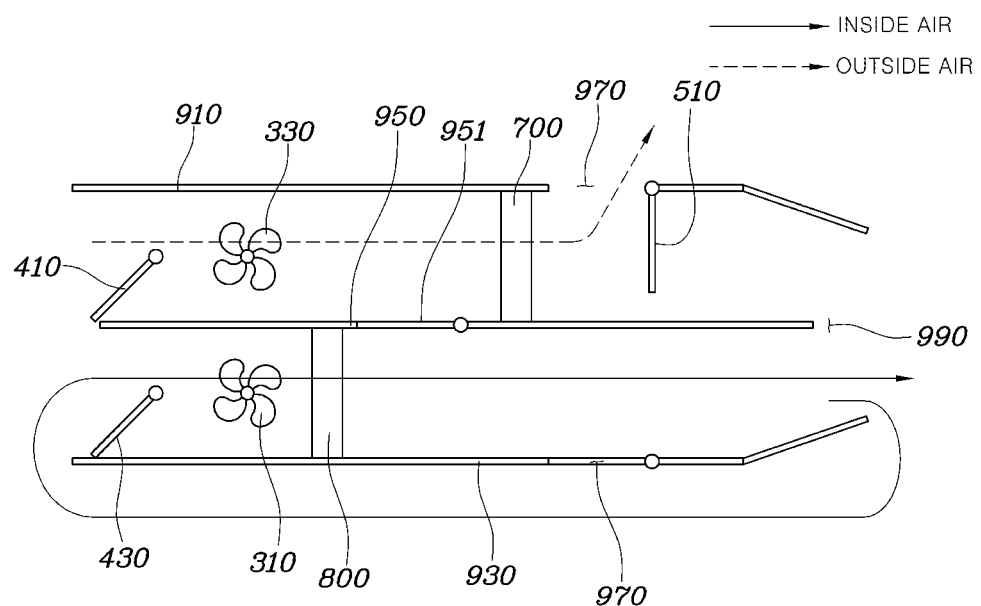
FIGS. 3 to 6 are views each illustrating the flow of air for each mode according to an exemplary embodiment of the present disclosure.

FIG. 3 is a view illustrating the flow of air in the maximum cooling mode. In the maximum cooling mode, the controller may be configured to operate and adjust the adjustment door unit 600, the inlet door unit 400, the outlet door unit 500, the heating blower 330, and the cooling blower 310. First, the controller may be configured to operate the inlet door unit 400 such that both the inside air and the outside air are introduced. In particular, the outside air introduced into the outside air inlet port 111 may move in the upper side of the heating blower 330 through the first duct 110, thereby being introduced into the adjustment space 200. The outside air introduced into the adjustment space 200 may be to the heating blower 330 side by the inlet door unit 400, may be heated through the condenser 700, and then may move to the heating duct 910.

In addition, the inside air introduced into the inside air inlet port 131 may move in the lower side of the heating blower 330 through the second duct 130, thereby being introduced into the adjustment space 200. The inside air introduced into the adjustment space 200 may move to the cooling blower 310 side by the inlet door unit 400, may be cooled through the evaporation core 800, and then may move to the cooling duct 930. At this time, the controller may be configured to operate the outlet door unit 500 to discharge all the cooled air in the cooling duct 930 to the indoor space side, and all the heated air in the heating duct 910 may be discharged to the outdoor space. In other words, in the maximum cooling mode of the present disclosure, the indoor cold air may be transferred to the evaporation core 800 side, and thus, the air, cooled after heat-exchange with the evaporation core 800, may be supplied to the indoor space, and the outside air may be transferred to the condenser 700 to cause heat to be radiated in the condenser 700, thereby increasing the cooling capacity of the evaporation core 800. Then, the heated air may be discharged to the outdoor space.

Figure 4:
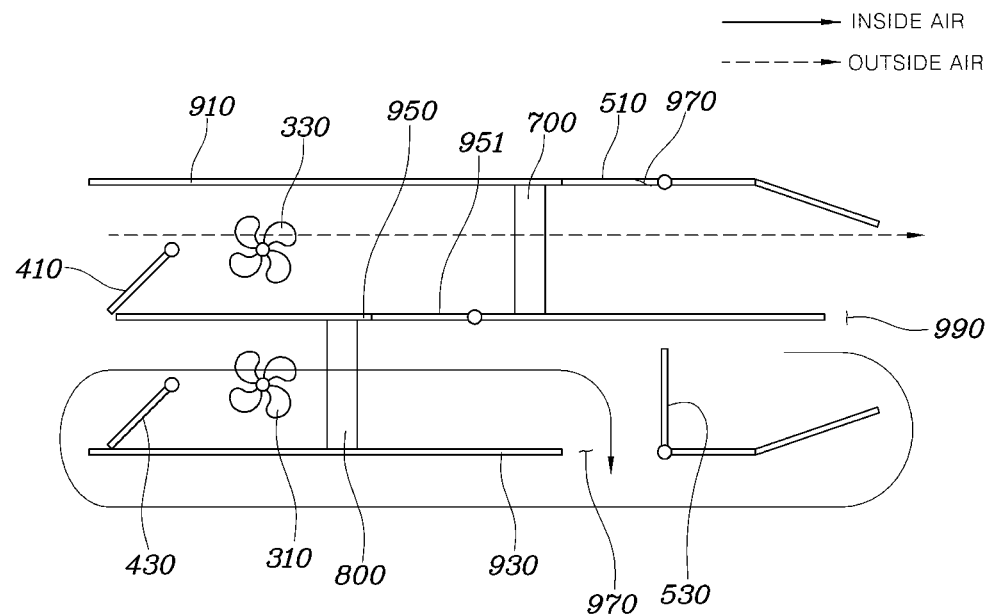

FIG. 4 is a view illustrating the flow of air in the heating mode using outside air. The controller may be configured to operate the adjustment door unit 600, the inlet door unit 400, the outlet door unit 500, the heating blower 330, and the cooling blower 310. First, the controller may be configured to operate the inlet door unit 400 such that both the inside air and the outside air are introduced. The outside air introduced into the outside air inlet port 111 may move in the upper side of the heating blower 330 through the first duct 110, thereby being introduced into the adjustment space 200. The outside air introduced into the adjustment space 200 may move to the heating blower 330 side by the inlet door unit 400, may be heated through the condenser 700, and then may move to the heating duct 910.

In addition, the inside air introduced into the inside air inlet port 131 may move in the lower side of the heating blower 330 through the second duct 130, thereby being introduced into the adjustment space 200. The inside air introduced into the adjustment space 200 may move to the cooling blower 310 side by the inlet door unit 400, may be cooled through the evaporation core 800, and then may move to the cooling duct 930. At this time, the controller may be configured to operate the outlet door unit 500 to discharge all the cooled air in the cooling duct 930 to the outdoor space side, and all the heated air in the heating duct 910 may be discharged to the indoor space. In other words, in the heating mode using outside air in the present disclosure, the inside air may be transferred to the evaporation core 800 side through the second duct 130 by the amount of the outside air introduced into the indoor space to improve the heat absorption performance of the evaporation core 800, thereby securing heating performance, and the air heated through the condenser 700 may be discharged to the indoor space. The cooled wind, which has passed through the evaporation core 800, may be discharged to the outdoor space.

Figure 5:
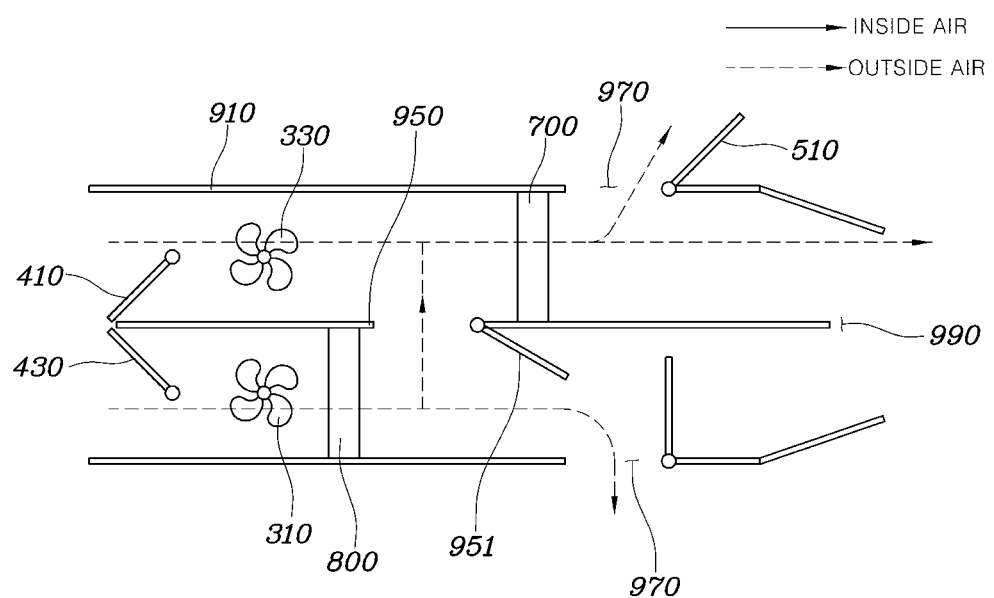

FIG. 5 is a view illustrating the flow of air in the dehumidifying mode. To perform the dehumidifying mode, the air-conditioning system may further include a blocking door 951, installed between the evaporation core 800 and the condenser 700. The controller may be configured to operate the adjustment door unit 600, the inlet door unit 400, the outlet door unit 500, the blocking door 951, the heating blower 330, and the cooling blower 310. First, the controller may be configured to operate the inlet door unit 400 such that only the outside air is introduced. The outside air introduced into the outside air inlet port 111 branches into the first duct 110 and the second duct 130, thereby being introduced into the adjustment space 200.

The outside air introduced into the adjustment space 200 may be introduced into the cooling blower 310 by the inlet door unit 400 to remove moisture therefrom through the evaporation core 800, then may pass through the blocking door 951 to increase the temperature of the air in the condenser 700, and then may be discharged to the indoor space by the outlet door unit 500. At this time, when necessary, the heating blower 330 may be configured to operate simultaneously to mix the outside air, which is heated but not dehumidified through the condenser 700, with the dehumidified air and thus, a portion of the mixed air may be discharged to the indoor space and a portion of the mixed air may be discharged to the outdoor space.

Figure 6:
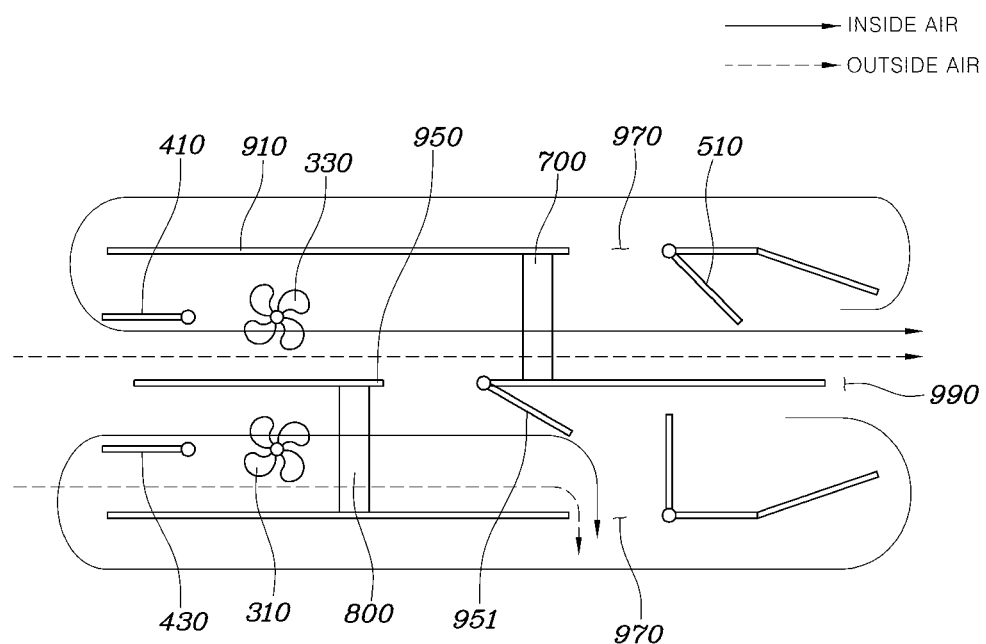

FIG. 6 is a view illustrating the flow of air in the maximum heating mode partially using inside air. In the maximum heating mode, the controller may be configured to operate the adjustment door unit 600, the inlet door unit 400, the outlet door unit 500, the heating blower 330, and the cooling blower 310. First, the controller may be configured to operate the inlet door unit 400 to cause both the inside air and the outside air to be introduced and the outside air inlet port 111 side may be opened more than the inside air inlet port 131 side.

Further, the outside air introduced into the outside air inlet port 111 may move in the upper side of the heating blower 330 through the first duct 110, thereby being introduced into the adjustment space 200. A portion of the outside air (e.g., a first amount of outside air or a first portion thereof) introduced into the adjustment space 200 may be moved by the inlet door unit 400 to the heating blower 330 side, may be heated through the condenser 700, and then may be moved to the heating duct 910, and another portion of the outside air (e.g., a second amount of outside air or a second portion thereof) may be moved to the cooling blower 310 side, may be cooled through the evaporation core 800, and then may be moved to the cooling duct 930. In addition, the inside air introduced into the inside air inlet port 131 may move in the lower side of the heating blower 330 through the second duct 130, to be introduced into the adjustment space 200. A portion of the inside air (e.g., a first portion of inside air or a first amount thereof) introduced into the adjustment space 200 may be moved by the inlet door unit 400 to the cooling blower 310 side, may be cooled through the evaporation core 800, and then may be moved to the cooling duct 930, and another portion of the inside air (e.g. a second portion of inside air or a second amount thereof) may be moved to the heating blower 330 side, may be heated through the condenser 700, and then may be moved to the heating duct 910.

At this time, the controller may be configured to operate the outlet door unit 500 and thus, all the cooled air in the cooling duct 930 may be discharged to the outdoor space side, and all the heated air in the heating duct 910 may be discharged to the indoor space. In other words, in the maximum heating mode partially using the inside air in the present disclosure, to maximize heating performance, a portion of the inside air may be introduced to improve heating performance. However, there is a limit to the amount of the air capable of being supplied to the indoor space due to the generation of carbon dioxide or moisture. Thus, a portion of the wasted inside air may be supplied to the evaporation core 800 side to improve heating performance.

Therefore, according to the vehicular air-conditioning system of the present disclosure as described above, the layout of the vehicle is maintained by utilizing the cowl panel side as the outside air inlet flow path, and the air-conditioning system may be disposed or installed at a location, which is closest to the indoor space, thereby minimizing heat loss. In addition, the air-conditioning system itself may be formed in a more compact shape by forming the inlet port and the outlet port, through which the inside air or the outside air is introduced, at right angles. By causing the outside air to bypass to the indoor space, the temperature of the outside air may be increased or decreased to thus improve the entire system performance.

While the present disclosure has been illustrated and explained with respect to specific exemplary embodiments thereof, it will be obvious to a person ordinarily skilled in the art that the present disclosure can be variously modified and changed without departing from the scope of the technical idea of the present disclosure, which is defined by the accompanying claims.

What is claimed is:
1. An air-conditioning system for a vehicle, comprising:
   a heating blower and a cooling blower disposed on opposite sides to face each other with an adjustment space being interposed therebetween, wherein the heating blower and the cooling blower are configured to receive air thereinto in an axial direction from the adjustment space and configured to discharge the air in a radial direction;
   a first duct and a second duct configured to transfer outside air or inside air and extending in the axial direction of the heating blower and the cooling blower, wherein a first end of each of the first duct and the second duct is connected to the adjustment space to supply the outside air or the inside air to the adjustment space;
   an inlet door unit disposed in the adjustment space and configured to adjust the air introduced from the first duct or the second duct to be selectively supplied to the heating blower or the cooling blower;
   a condenser and an evaporation core respectively disposed in the radial directions of the heating blower and the cooling blower and connected to each other via a refrigerant line; and an outlet door unit configured to regulate the air, which has passed through the condenser or the evaporation core, to be selectively discharged to the indoor space or the outdoor space, wherein a direction of the air flowing through the first duct and the second duct intersects with a direction of the air ejected from the heating blower or the cooling blower.

2. The air-conditioning system of claim 1, wherein the first duct and the second duct are arranged vertically, wherein air introduced into the adjustment space from the first duct is introduced into the adjustment space through an upper side of one of the cooling blower and the heating blower disposed on an inlet port side of the adjustment space, and wherein air introduced into the adjustment space from the second duct is introduced into the adjustment space through a lower side of one of the cooling blower and the heating blower disposed on the inlet port side of the adjustment space.

3. The air-conditioning system of claim 1, wherein the first duct includes an outside air inlet port formed in a second end thereof and is disposed above an engine compartment with the outside air inlet port disposed above the cowl panel to cause outside air introduced through the outside air inlet port disposed on the cowl panel side to move in one or both of the first duct and the second duct and to introduce the outside air into the adjustment space.

4. The air-conditioning system of claim 1, wherein the second duct includes an inside air inlet port formed in a second end thereof and is connected to a dash board of an engine compartment, to move inside air in one or both of the first duct and the second duct through the dash board and introduce the inside air into the adjustment space.

5. The air-conditioning system of claim 1, wherein the first duct and the second duct are disposed in an engine compartment, one of the first duct and the second duct includes an outside air inlet port through which the outside air is introduced, and the outside air inlet port communicates with an outside of the vehicle on the cowl panel side, and wherein a remaining one of the first duct and the second duct includes an inside air inlet port through which inside air is introduced, the inside air inlet port is disposed in the dash panel, to move air introduced from the cowl panel or dash panel side in one or both of the first duct and the second duct and to introduce the air into the adjustment space.

6. The air-conditioning system of claim 5, wherein the first duct and the second duct are disposed in the engine compartment, the inside air inlet port and the outside air inlet port are disposed on the indoor side with respect to the dash panel, and the outdoor space is an interior of the engine compartment.

7. The air-conditioning system of claim 5, further comprising:
an adjustment door unit disposed between the outside air inlet port and the inside air inlet port to open or close the outside air intake side or the inside air inlet port side to adjust a flow rate of the air introduced through the outside air inlet port and the outside air inlet port.

8. The air-conditioning system of claim 5, wherein the second duct includes an outside air inlet aperture formed on the outside air inlet port side and an inside air inlet aperture formed on the inside air inlet port side, and the air-conditioning system further includes a control door unit disposed between the outside air inlet aperture and the inside air inlet aperture.

9. The air-conditioning system of claim 8, wherein the outside air inlet aperture of the second duct is formed in a wall surface at a point where the first duct and the second duct branch and when the outside air inlet aperture is closed by the adjustment door unit, the outside air is continuously introduced into one or both of the first duct and the second duct.

10. The air-conditioning system of claim 8, wherein when the adjustment door unit closes the outside air inlet aperture, the inside air introduced through the inside air inlet aperture moves to one of the first duct and the second duct, and the outside air introduced through the outside air inlet aperture moves to a remaining one of the first duct and the second duct to isolate the flow paths in which the inside air and the outside air move from each other.

11. The air-conditioning system of claim 8, wherein the outside air introduced through the outside air inlet aperture when the adjustment door unit closes the inside air inlet aperture branches and moves into the first duct and the second duct.

12. The air-conditioning system of claim 1, further comprising:
a heating duct disposed in the radial direction of the heating blower and configured to form a flow path, which allows the air introduced into the adjustment space to be selectively discharged to the indoor space or the outdoor space through the heating blower and the condenser; and
a cooling duct disposed in the radial direction of the cooling blower and configured to form a flow path, which allows the air introduced into the adjustment space to be selectively discharged to the indoor space or the outdoor space through the cooling blower and the evaporation core.

13. The air-conditioning system of claim 12, wherein the cooling duct and the heating duct are arranged vertically and the air introduced into the adjustment space is heated through the condenser or cooled through the evaporation core and is selectively discharged to the indoor space or the outdoor space by the outlet door unit.

14. The air-conditioning system of claim 12, wherein the cooling duct and the heating duct are configured with a single duct, which is separated into the cooling duct and the heating duct by a partition wall formed therein to separate a cold air flow path and a hot air flow path from each other, and wherein each of the cooling duct and the heating duct has an outdoor outlet port through which the air introduced through the adjustment space is discharged to the outdoor space and one indoor outlet port, through which the air is discharged to the indoor space, is formed on an indoor side such that the indoor outlet port is shared by the cooling duct and the heating duct.

15. The air-conditioning system of claim 1, wherein the outlet door unit includes:
a heating inside/outside air adjustment door configured to selectively discharge the air, which has passed through the condenser, to the indoor space or the outdoor space; and
a cooling inside/outside air adjustment door configured to selectively discharge the air, which has passed through the evaporation core, to the indoor space or the outdoor space.

16. The air-conditioning system of claim 1, wherein the air introduced into the upper side of the adjustment space is introduced into a rotary shaft of the heating blower or the cooling blower by the inlet door unit and is discharged to the condenser disposed in the radial direction of the heating blower or the evaporation core disposed in the radial direction of the cooling blower.

17. The air-conditioning system of claim 1, wherein the air introduced into the lower side of the adjustment space is introduced into a rotary shaft of the heating blower or the cooling blower by the inlet door unit and is discharged to the condenser disposed in the radial direction of the heating blower or the evaporation core disposed in the radial direction of the cooling blower.

18. The air-conditioning system of claim 1, wherein the inlet door unit includes:
 a first door, an opening degree of which is adjusted to transfer the air, which is introduced into an upper side of the adjustment space, to a rotary shaft of the heating blower or the cooling blower; and
 a second door, an opening degree of which is adjusted to transfer the air, which is introduced into a lower side of the adjustment space, to the rotary shaft of the heating blower or the cooling blower.

19. The air-conditioning system of claim 1, further comprising:
 a controller configured to: adjust introduction of air by adjusting rotation of the heating blower and the cooling blower; adjust an opening degree of an inlet door unit to transfer the air introduced into the adjustment space to the condenser or the evaporation core side; and adjust an opening degree of an outlet door unit to transfer the air to the indoor space or the outdoor space.

20. The air-conditioning system of claim 19, further comprising:
 an adjustment door unit configured to adjust inside air or outside air within each of the first duct and the second duct,
 wherein, in a maximum cooling mode, the controller is configured to adjust the adjustment door unit to allow both the inside air and the outside air to be introduced, and adjust the inlet door unit and the outlet door unit to transfer the inside air to the evaporation core to be cooled and is then discharged to the indoor space and to transfer the outside air to the condenser to be heated and is then discharged to the outdoor space.

21. The air-conditioning system of claim 19, further comprising:
 an adjustment door unit configured to adjust introduction of inside air or outside air within each of the first duct and the second duct,
 wherein, in a heating mode using outside air, the controller is configured to adjust the adjustment door unit to allow both the inside air and the outside air to be introduced, adjust the inlet door unit and the outlet door unit to transfer the inside air to the evaporation core to be cooled and is then discharged to the outdoor space and to transfer the outside air to the condenser to be heated and is then discharged to the indoor space.

22. The air-conditioning system of claim 19, further comprising:
 an adjustment door unit configured to adjust introduction of inside air or outside air within the first duct or the second duct; and
 a blocking door installed between the evaporation core and the condenser,
 wherein, in a dehumidifying mode, the controller is configured to adjust the adjustment door unit to block the inside air and to allow the outside air to be introduced, adjust the inlet door unit and the outlet door unit to transfer the outside air to the evaporation core to be cooled and to be dehumidified, and then adjust a mix door to transfer dehumidified air to the condenser to be heated and is then discharged to the indoor space.

23. The air-conditioning system of claim 19, further comprising:
 an adjustment door unit configured to adjust introduction of inside air or outside air within each of the first duct and the second duct,
 wherein, in a maximum heating mode partially using inside air, the controller is configured to adjust the adjustment door unit to allow both the inside air and the outside air to be introduced, adjust the inlet door unit and the outlet door unit to transfer both the inside air and outside air to the evaporation core and the condenser to be cooled and heated, the air cooled through the evaporation core being discharged to the outside space and the air heated through the condenser being discharged to the indoor space.

24. The air-conditioning system of claim 1, wherein the heating blower or the cooling blower is opened on the adjustment space side with respect to the adjustment space and a rear side of the adjustment space is closed to introduce the outside air or the inside air into the adjustment space and then toward a rotary shaft of the heating blower or the cooling blower from the adjustment space.

* * * * *